United States Patent [19]

Thorpe

[11] Patent Number: 4,978,963
[45] Date of Patent: Dec. 18, 1990

[54] RF SIGNAL DIRECTION FINDING APPARATUS

[75] Inventor: J. Carlton Thorpe, Poway, Calif.

[73] Assignee: TRW Inc., Redondo Beach, Calif.

[21] Appl. No.: 498,469

[22] Filed: Mar. 26, 1990

Related U.S. Application Data

[63] Continuation of Ser. No. 265,071, Oct. 31, 1988, abandoned.

[51] Int. Cl.$^5$ .............................................. G01S 5/04
[52] U.S. Cl. ...................................... 342/433; 342/442
[58] Field of Search ................. 342/375, 433, 435, 442

[56] References Cited

U.S. PATENT DOCUMENTS

| | | | |
|---|---|---|---|
| 2,841,787 | 7/1958 | Knott | 342/433 |
| 4,107,692 | 8/1978 | Hutcheon et al. | |
| 4,123,759 | 10/1978 | Hines et al. | |
| 4,358,768 | 11/1982 | Ernst et al. | |
| 4,855,748 | 8/1989 | Brandao et al. | 342/455 |

Primary Examiner—Theodore M. Blum
Attorney, Agent, or Firm—Ronald M. Goldman; Ronald L. Taylor

[57] ABSTRACT

Angle of arrival of a pulsed RF signal, such as that emitted by a radar transmitter, is determined by use of a detection circuit that contains a single RF receiver. The RF signal direction of arrival determining system contains a switching means to automatically alternately switch the outputs from two physically spaced receiving antennas to the input of the RF tuner. In turn the tuner's output is coupled to a power divider. The output of this power divider is branched, one output being coupled through a first IF amplifier to one of the two inputs of a phase detector and the second output being coupled through a second circuit, containing a delay line and an IF amplifier serially arranged, to the second input of the phase detector. The phase detector displays the phase difference between the two signals.

23 Claims, 2 Drawing Sheets

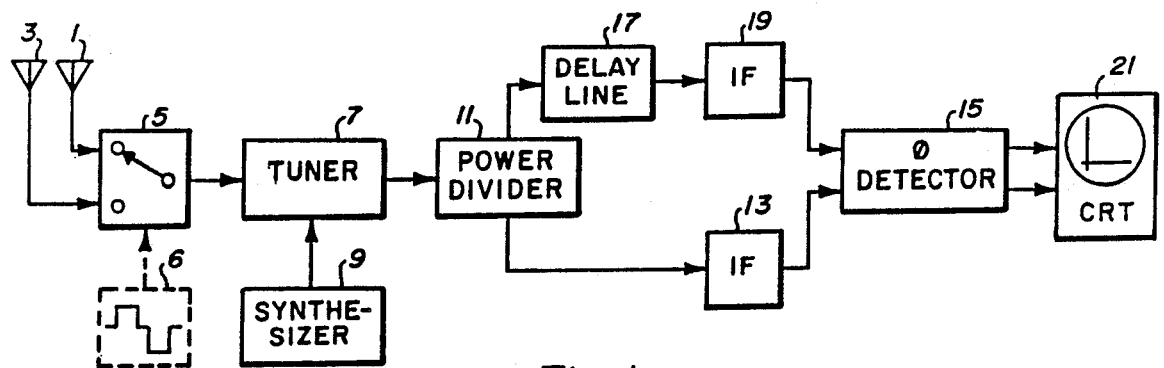
Fig_1
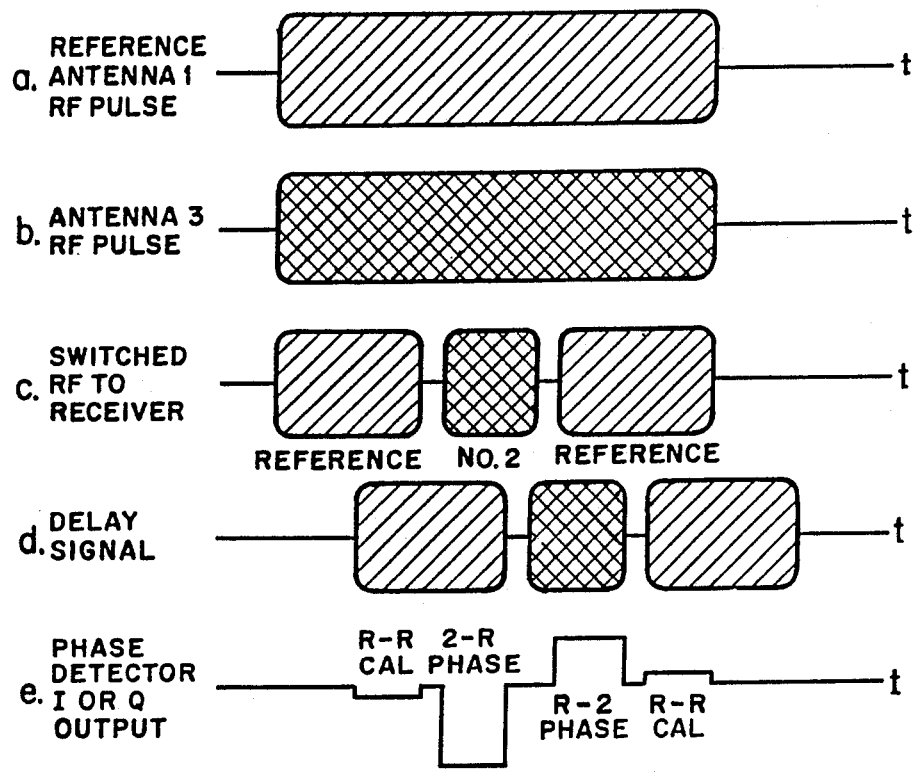
Fig_2

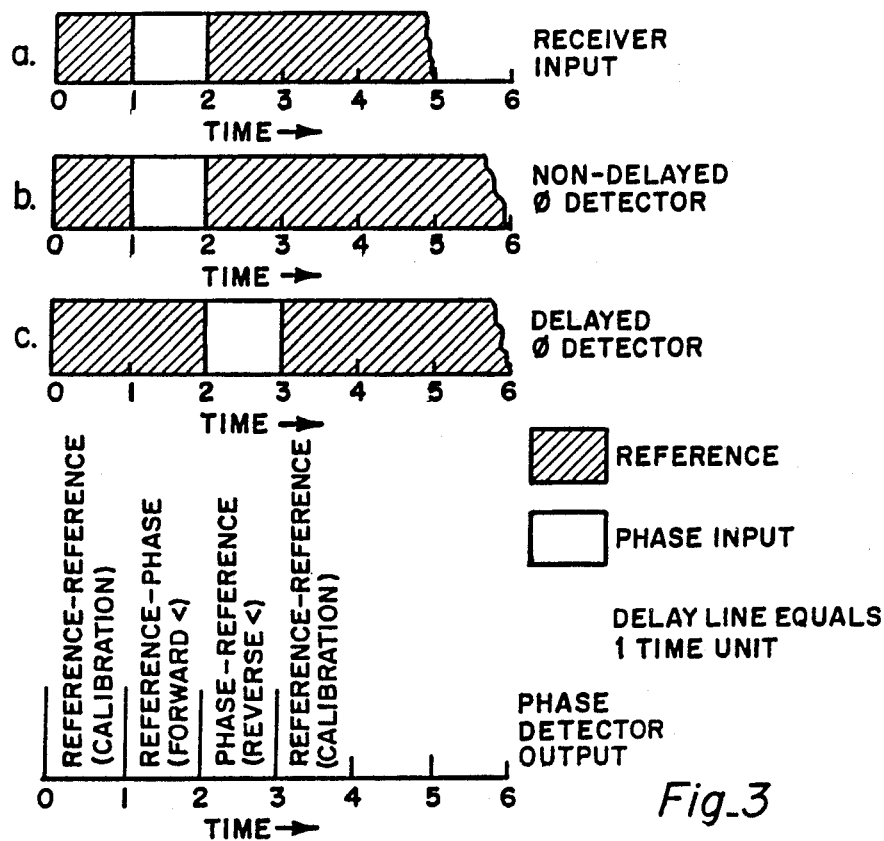
Fig_3
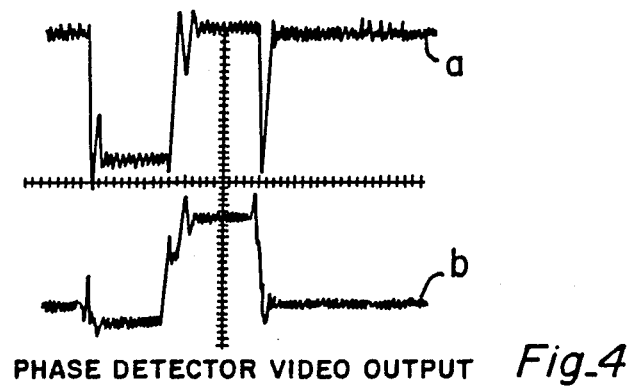
PHASE DETECTOR VIDEO OUTPUT  Fig_4
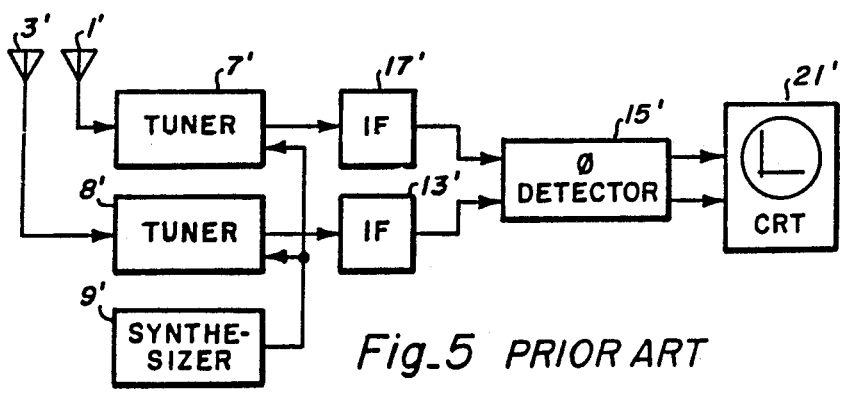
Fig_5 PRIOR ART

4,978,963

RF SIGNAL DIRECTION FINDING APPARATUS

This application is a continuation of application Ser. No. 07/265,071, filed, Oct. 31, 1988, now abandoned

Field of the Invention

The present invention relates to systems for determining the direction of incoming RF electromagnetic energy propagated through space from a remote RF source and, more particularly, to an RF direction finding system that uses a single RF receiver.

BACKGROUND.

Direction finding or angle of arrival systems as they are known are measuring and indicating devices that have application in both military and commercial pursuits to locate remote RF sources. Electronic equipment of that type monitors the RF spectrum, which includes the microwave frequency range, for RF signals and determines the direction of the source of that signal: In military applications these signals may originate from a hostile radar transmitter and in commercial applications the RF signals may emanate from a directional marker or beacon signal transmitter. Specifics of those applications are known to those skilled in the art and need not be addressed in further detail in this application. Each system requires accurate measurement of the phase difference between the phase of signals received at two or more receiving antennas that are located physically spaced from one another. Given two ac signals that are sinusoidal in character and of the same frequency, the amplitude of the signals follow the mathematical expression $A1 = K\sin\Omega t$, where K represents the absolute value of the signals's amplitude, $\Omega$ the frequency, and t represents time. If the second signals amplitude is governed by the $A2 = K\sin(\Omega wt + \Theta)$, the factor $\Theta$ represents the phase difference between the two signals. Thus if $\Theta$ equals $\Theta$, the two signals are said to be "in-phase". Depending upon the direction of propagation of the incoming RF signal relative to the spatial positions of the antennas, the signal arrives at the two antennas slightly displaced in time. Consequently, the signal received at one antenna may be ever so slightly displaced in electrical phase relative to the phase of that same signal as it appears at the second antenna in the system. Since the signal emanates from a single source, this phase difference is thus representative of the angle at which the incoming signal traveled to the receiving station containing the direction finding equipment. In military application this direction information is considered together with other kinds of information provided by other electronic equipment, not relevant to the present invention, to enable personnel operating the direction finding equipment to determine the position of the hostile radar source.

Typical phase measurement systems in direction finding application incorporates two complete RF receivers which are phase matched and/or calibrated to provide the necessary reference and angle signals needed for accurate phase measurements. The RF receivers are complex and expensive pieces of electronic equipment. They must be checked and calibrated from time to time by skilled technicians to ensure that the receivers are properly "matched" so that accurate measurements are obtained. Such duplication of significant system elements, such as the RF receivers, is expensive.

A principal purpose of the present invention is to reduce the cost of manufacturing and maintaining RF direction finding equipment. A further object of the invention is to eliminate the need for a second RF receiver in RF direction equipment. An additional object is to provide direction finding apparatus that uses existing components and technology and that is of improved reliability resulting from elimination of complex elements typical of existing direction finding systems. A still further object is to provide a simplified method for determining the angle of arrival of an RF pulse signal.

SUMMARY

In a radio direction finding apparatus of the kind containing at least two physically spaced receiving antennas, an RF tuner for receiving RF at an input and converting such RF to an intermediate frequency, and a phase detector, the latter of which includes display apparatus, such as an oscillograph type CRT display, for providing a measurement and/or display of phase difference between signals applied to two phase detector inputs; an electronic switching means is provided to automatically alternately periodically switch the outputs from the two receiving antennas to the input of the RF tuner. In turn the tuner's output is coupled to a power divider. The output of this power divider is branched, one output being coupled through a first IF amplifier to one of the two inputs of the phase detector and the second output being coupled through a circuit, containing a delay line and an IF amplifier in series, coupled to the second input of the phase detector.

The phase detector displays a visual representation of the signal in the first branch or reference signal for calibration purposes. As the receiver input is switched back and forth between the two antennas at a rate higher than the delay duration provided by the delay circuit in the second branch of the circuit, the two signals inputted concurrently to the phase detector at a point in time stem from the separate antennas, and thus overlap in time. Due to such overlap between the delayed first signal from the second antenna and the reference signal from the first antenna an output level is provided that represents the phase difference of the signals present at the systems receiving antennas. Accordingly a relative phase difference measurement is obtained with but a single receiver allowing for the advantageous results previously described.

A further advantage of the invention is that existing equipment may be modified to incorporate the novel circuit by the addition of a small number of component elements, leaving the second receiver of such systems, which theoretically becomes redundant, as a back-up or spare.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS

In the drawings:

FIG. 1 illustrates an embodiment of the invention in block diagram form;

FIGS. 2a through 2e illustrate signals representative of signals occurring at various instances of time in the operation of the embodiment of FIG. 1;

FIGS. 3a, 3b, 3c, and 3d illustrate further the timing of and processing of the various signals;

FIG. 4 is a depiction of signals appearing on a display device in one practical embodiment incorporating the invention; and FIG. 5 illustrates a prior art RF direction finding system in block diagram form.

DETAILED DESCRIPTION OF A PREFERRED EMBODIMENT.

In the embodiments of FIG. 1, a pair of antennas 1 and 3, which are spatially located at points physically distant from one another, typically on the order of less than one wavelength at the RF frequency, are connected to the respective two inputs of a switch 5, represented in the figure in block diagram form. The output of the switch is coupled to the input of RF tuner 7, suitably of the superhetrodyne type. Switch 5, the antenna switch, is a single pole multiple throw type switch, and, specifically is an electronic switch, the details of which are hereinafter described in greater detail. Tuner 7 is of a conventional superhetrodyne tuner structure and operates in conjunction with a known type of local oscillator or frequency synthesizer 9 to produce a corresponding signal at a lower frequency, the "i.f." frequency. The output of the synthesizer, referred to as an intermediate frequency local oscillator signal or, simply, IF OSC signal, is applied to the tuner's local oscillator input as illustrated. The IF signal output of the tuner is connected to an input of a power divider 11. An IF amplification circuit 13 is coupled between the output of power divider 11 and an input of phase detector 15, all of which are conventional and known electronic component structures.

A second output from power divider 11 is coupled in series circuit with a delay line 17 and an IF amplifier 19. The output of the latter amplifier is coupled into the second input of phase detector 15. The output of the phase detector is coupled to a display device 21, such as an oscillograph or oscilloscope, a conventional instrument used in electronic apparatus for measuring phase of applied signals and for viewing signals in many other applications.

Antenna switch 5 is a conventional RF switch, suitable for coupling RF signals without introduction of significant signal loss. It is controlled by conventional timing circuits, illustrated in dash lines 6 that cause the switch to connect to the antennas alternately on a periodic basis and is "turned on" by personnel operating the system. The switch connects the first antenna through to the tuner for a predetermined dwell interval, then switches the transfer circuit to the second antenna, resulting in an inherent very brief switching interval with neither antenna connected, and then connects the second antenna to the RF tuner for a further dwell interval, suitably the same duration as the dwell interval in which the first antenna was connected through to the tuner. Thereafter the switch reconnects the first antenna to the RF tuner. The switching process repeats periodically under control of timing circuits 6.

In operation an RF signal originating at a remote source, not illustrated, is incident upon both antennas, reference antenna 1 and antenna 3, the comparison or "angle" antenna. As depicted in FIGS. 2a and 2b in graphic form, the signals are of a limited duration or pulse of a width T1. It is noted that the duration of signals as illustrated in FIGS. 2a and 2b are the same. Effectively they commence and end simultaneously. As those skilled in the art appreciate, the signals are effectively present at both antennas, are of the same average amplitude, and differ essentially only in electrical phase. For example, if the remote RF source is located equidistant from the two antennas, then the RF signals, which propagate at the velocity of light, arrive at the two antennas simultaneously. Consequently in that circumstance there will be no phase difference between the two signals.

In other cases there is a phase difference. Because the antennas are spaced only a short physical distance apart, on the order of feet and not miles or hundreds of miles and usually less than one wavelength, the signals are effectively received at the antennas simultaneously in macro state, differing only in the instantaneous amplitude of the RF signal that exists at that time. That difference in instantaneous amplitude is representative of the electrical phase.

RF tuner 7 detects the signals in a conventional superhetrodyne type detection process. The incoming signal is "beat" or mixed with the high frequency signal supplied by frequency synthesizer 9 to form a corresponding signal at another frequency corresponding to the difference between the two frequencies, referred to as an intermediate frequency or IF. Though such superhetrodyne type frequency "down conversion" is not theoretically critical to the invention, in the practical sense, such down conversion is always used. The lower frequencies obtained are easier to handle and the components are less expensive as those skilled in the art know of and appreciate. The derived IF signal is supplied from the tuner output to the input of power divider 11, which divides that signal between the power divider's two output branches.

The first portion of the signal is outputted from one branch to IF amplifier 13 and from that amplifier the amplified IF signal is applied to one input of phase detector 15. The second portion of the signal outputted from the power divider's second branch is applied to delay line 17, in which the signal is delayed or effectively stored for an interval. Following a delay interval the signal is then amplified in IF amplifier 19 and is applied to the second input of the phase detector. The two IF amplifiers are essentially identical and provide the same gain to the applied signals so that the signals in each path are maintained essentially the same, except for slight losses in the delay circuit.

FIG. 2c presents the amplitude of the signal output of switch 5. The output passes the reference signal from antenna 1 for a predetermined "dwell" interval. Then, following a short switching time interval, the output passes the output of antenna 3 for a certain dwell interval, suitably identical in duration to the first interval. Following another short switching interval, the antenna switch again passes the reference signal from antenna I into the tuner for another dwell interval. This process repeats as the time multiplexing process resulting from the automatic periodic switching of antenna switch 5 repeats.

The dwell interval typically is no greater than one half the duration of the input pulse. By way of specific example, the pulsed RF signal is of a duration of five hundred nanoseconds, that of the first dwell interval, two hundred nanoseconds, and that of the switching interval, two hundred nanoseconds.

FIG. 2d represents the signals appearing at the output of IF amplifier 19. These signals are as illustrated delayed in time as compared to or referenced against the signals appearing at the output of IF amplifier 13 as described in connection with the preceding FIG. 2c. The resulting output of phase detector 15 as viewed on an oscillograph or oscilloscope is illustrated in FIG. 2e. The video information provided represents system calibration, the difference in phase between the second antenna, antenna 3, and the reference antenna, antenna 1, the difference in phase between the reference antenna and the second antenna and system calibration.

FIG. 3a represents the reference and phase signals as applied to the receivers, that is the tuner input, the hatched lines indicating the input supplied by antenna 1, the clear portion representing that supplied by antenna 3.

As shown in FIGS. 3b and 3c, the delay interval provided by delay line 17 has to be such that the "phase" input, represented by the clear block, overlaps the reference input, represented by the hatch lines, to the phase detector. This time delay is one time unit. This time delay also needs to be one half the switching time.

The delay line may be of any suitable construction that provides an appropriate delay and, ideally, is essentially independent of frequency in the range of frequency of interest, namely the intermediate frequency.

In one practical embodiment of the invention, a demonstration receiver made by the TRW company was used, the RF switch was one made available by the Konwave company, the IF amplifiers were type SL 2521 EXP obtained from the Plessy Company and the phase detector was a model PC 120 obtained from the Olektron Company. The oscilloscope picture presented in FIG. 4 provides a graphic illustration of the results obtained in the described practical embodiment. This shows two waveforms, the first, a, represents the sine of the angles and the second, b, represents the cosine of those angles. The phase detector converts the phase difference between the signals presented at the phase detectors inputs into sine and cosine output signals, often referred to as "I & Q" signals. The outputs are voltages that are sinusoidal in nature and follow a sine/-cosine relationship based on the phase difference of the input signal.

Both the sine and cosine output signals are required in order to resolve an ambiguity associated with a single output; ie. the sine of 45 degrees and of 135 degrees are of the same value. However the cosine of 45 degrees and 135 degrees are unequal and therefor the cosine signal can be used to resolve the ambiguity in angle value presented by the sine output signal. As presented in this figure the wave forms are not entirely perfect but include some element of "ringing" as results from the switching in the circuit and the natural resonances of the electrical circuit.

A prior art system is illustrated in block diagram form in FIG. 5. The prior art system includes the same two antennas 31 and 33, a pair of tuners 37 and 37', a frequency synthesizer 39 which is coupled to each of the tuners, a first IF amplifier 47 whose input is connected of tuner 37, the output of which is connected to one input of phase detector 45. A second IF amplifier 47' has an input connected to the output of the second tuner 37' and an output connected to the second input of phase detector 45. The output of the phase detector is connected to a display device, such as an oscilloscope, just as in the arrangement used in the specific example earlier described.

In an actual system and as an alternative embodiment of the invention the display device used in the basic demonstration system earlier described is replaced by an automated measuring device, suitably an analog to digital, A to D, converter of conventional structure, not illustrated. The analog to digital converter converts the voltage outputs from the phase detector into the form of digital information, digitized phase angle information. In turn the digitized phase angle information is processed by conventional digital techniques and is used for any application requiring knowledge of the bearing angle between a receiving system or station and a radio signal source.

The "switching" phase measurement system takes advantage of a delay line that is placed in the receivers intermediate frequency circuit to store a sample of the reference signal from the first or reference antenna, during the time when the RF receiver is switched to the signal outputted from the second antenna. The stored reference signal is then compared in phase with the non delayed signal. As is apparent, the system requires only a minimum of calibration and/or phase matching of the systems components. This is so because essentially all of the circuit elements located between the antenna input switch and the phase detector are common to both signal circuits, the reference signal and the angle signal and, hence, changes in the electrical characteristics of the circuits cannot differentially affect the relative phase of the two signals. Both signals are changed to the same degree by any change in the circuit component while the difference, which is the important aspect, remains constant.

There is an exception: The two separate IF amplifiers are not common to both circuits and, though being of identical structure, those amplifiers could differ in electrical characteristics as could change with the ambient conditions, such as temperature.

The difference between the two IF amplifiers appears as the calibration phase error "CAL" in FIG. 2(e). The CAL phase angle is mathematically subtracted from the measured angle to determine the true phase angle difference between the two input signals. The system is essentially calibrated on a measurement by measurement basis. In the demonstration system described the calibration is made twice during the 500 nanosecond measurement period.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. An RF direction finding system for determining angle of arrival of RF pulse signals, said pulse signals being within a predetermined range of pulse durations and within a predetermined range of pulse repetition rates, comprising:
   at least two physically spaced receiving antennas;
   RF tuner means for converting received RF signals applied at an input to an intermediate frequency signal at an output;
   antenna switching means for alternately periodically coupling each of said antenna means to said tuner means input for essentially equal predetermined dwell intervals to pass the RF signal in the phase received at the respective antennas to said tuner;

said antenna switching means having an output coupled to said tuner means input and a pair of inputs connected to respective ones of said antennas;

power divider means; said power divider means containing an input and two outputs; said power divider means input being connected to the output of said tuner means for dividing the inputted intermediate frequency signal between two power divider means outputs;

phase detector means;

first branch circuit means for coupling one output of said power divider to a first input of said phase detector means, said first branch circuit means including IF amplifier means;

second branch circuit means, including signal delay means and IF amplifier means serially connected, coupled in circuit between said second output of said power divider and a second input of said phase detector;

said signal delay means for delaying the application of signals applied at an input to an output by a predetermined delay interval;

said antenna switching means being operative to switch between antennas within a predetermined switching interval, and at a predetermined switching rate;

said switching interval being substantially less than said predetermined dwell interval and substantially less than said delay interval:

said dwell interval being no greater than one half of said pulse width or duration; whereby IF signals representative of RF signal received at the first antenna and of the same signal as received at the second antenna overlaps in time at the input of said phase detector means.

2. The method of determining the angle of arrival of an RF signal propagating in space including the steps of:
sampling the signal as received at each of two spaced locations to provide a serial signal stream containing alternate samples of said RF signal displaced in time;
branching said stream into two channels, a first channel and a second channel;
delaying the passage of said RF signal stream through said first channel to delay arrival of the signals for a predetermined interval; and
comparing the outputs of the two channels and determining the phase difference between the signals from the two channels.

3. The invention as defined in claim 1 wherein said predetermined delay interval of said signal delay means is equal to the sum of the dwell interval of said switching means and one half of the switching time of said switching means.

4. An RF direction finding system for determining angle of arrival of RF pulse signals, said pulse signals being within a predetermined range of pulse durations and within a predetermined range of pulse repetition rates, said system containing at least two physically spaced receiving antennas and RF signal processing means for processing RF signals, comprising in combination:
switching means for periodically coupling each of said antennas to said RF signal processing means for alternately consecutively applying a signal representative of a RF pulse received at each said antenna concurrently to each of a first and second signal transmission channels;
said switching means maintaining each antenna coupled to said processing means for a predetermined dwell interval and having a transition interval, substantially smaller than said dwell interval, in which said switching means couples neither antenna to said processing means;
said first transmission channel including delay means for delaying an inputted signal for a predetermined interval;
said second transmission channel being substantially identical to said first transmission channel in all respects excluding said delay means; whereby the signal outputted from said second channel is displaced in time from the same signal outputted from said first channel;
phase measuring means coupled to the outputs of both channels for displaying the difference in phase between said channel outputs.

5. The invention as defined in claim 4 wherein said predetermined delay time interval equals the sum of one half of the duration of the RF pulse and the transition switching time of said switching means.

6. An RF direction finding system for determining the angle of arrival of an RF pulse signal, said direction finding system containing at least two antennas for receiving propagating RF pulse signal with said antennas being spaced physically from one another, whereby said angle of arrival is represented by difference in electrical phase in the RF signal as received at the different antennas, and RF signal processing means for processing RF signals; the improvement wherein said RF signal processing means comprises:
first means for periodically alternately coupling to each of said antennas to define a composite signal representative of an RF pulse received at each said antenna and for applying said composite signal concurrently to each of a first and second signal transmission channel;
said first transmission channel including delay means for delaying an inputted signal for a predetermined interval; whereby the signal outputted from said second signal transmission channel is displaced in time from the same signal outputted from said first signal transmission channel; and
phase measuring means coupled to the outputs of said first and second signal transmission channels for determining the difference in phase between signals outputted from said first and second signal transmission channels.

7. The invention as defined in claim 6 wherein said first means includes switching means for coupling to said antennas for a predetermined dwell interval, and wherein said switching means has a transition interval between said dwell intervals in which said switching means couples neither antenna, said transition interval being substantially smaller than said dwell intervals.

8. The invention as defined in claim 7 wherein said RF pulse signal is within a predetermined range of pulse durations; wherein said dwell interval is less than said pulse duration; and wherein said predetermined interval provided by said delay means equals the sum of one half of the duration of the RF pulse and the transition switching time of said switching means.

9. The invention as defined in claim 8 wherein said switching means comprises:

RF switching means having two inputs and an output;
RF tuner means for deriving an IF signal from inputted RF signals;
said output of said switching means being coupled to said RF tuner means for supplying RF signals thereto;
power divider means having an input and two outputs for dividing signals applied at an input to said two outputs;
said input of said power divider means being coupled to said RF tuner means and said two outputs of said power divider means being coupled to said first and second signal transmission channels, respectively.

10. The invention as defined in claim 9 wherein said first transmission channel includes IF amplifier means; and wherein said second transmission channel includes IF amplifier means.

11. The invention as defined in claim 10 wherein said phase measuring means comprises further: phase detector means, said phase detector means being coupled to said outputs of said first and second signal transmission channels and providing two outputs; and oscilloscope means coupled to said phase detector means for displaying the relative electrical phase indicium outputted from said phase detector means.

12. The invention as defined in claim 11 wherein said second transmission channel is substantially identical to said first transmission channel in all respects, exclusive of said delay means.

13. The invention as defined in claim 6 wherein said second transmission channel is substantially identical to said first transmission channel in all respects, exclusive of said delay means.

14. The invention as defined in claim 6 wherein said first means comprises:

RF switching means having two inputs and an output;
RF tuner means for deriving an signal from inputted RF signals;
said output of said switching means being coupled to said RF tuner means for supplying RF signals thereto;
power divider means having an input and two outputs for dividing signals applied at an input to said two outputs;
said input of said power divider means being coupled to said RF tuner means and said two outputs of said power divider means being coupled to said first and second signal transmission channels, respectively.

15. The invention as defined in claim 14 wherein said phase measuring means comprises further: phase detector means, said phase detector means being coupled to said outputs of said first and second signal transmission channels and providing two outputs; and oscilloscope means coupled to said phase detector means for displaying the relative electrical phase indicium outputted from said phase detector means.

16. The invention as defined in claim 6 wherein said RF pulse signal is within a predetermined range of pulse durations; wherein said dwell interval is no greater than one half of said pulse duration; and wherein said predetermined interval provided by said delay means equals the sum of one half of the duration of the RF pulse and the transition switching time of said switching means.

17. In an RF system containing RF transmitter means for transmitting RF pulses and RF receiver means for receiving RF pulses and direction finding means included with said receiver means for determining the angle of arrival at said receiver means of an RF pulse signal from said RF transmitter means, said RF receiver means containing at least two antennas for receiving propagating RF with said receiving antennas being spaced physically apart from one another, and RF signal processing means for processing RF signals received by said RF receiver means, the improvement in which said RF signal processing means includes in combination:

first means for periodically alternately coupling to each of said antennas in circuit to define a composite signal representative of RF pulses received at each said antenna and for applying said composite signal to each of a first and second signal transmission channels;
said first transmission channel including delay means for delaying an inputted signal for a predetermined interval; whereby the signal outputted from said second signal transmission channel is displaced in time from the same signal outputted from said first signal transmission channel; and
phase measuring means coupled to the outputs of said first and second signal transmission channels for determining the difference in phase between signals outputted from said first and second signal transmission channels.

18. The invention as defined in claim 17 wherein said first means includes switching means for coupling to each antenna for a predetermined dwell interval; and wherein said switching means has a transition interval between said dwell intervals in which said switching means couples to neither antenna, said transition interval being substantially smaller than said dwell intervals.

19. The invention as defined in claim 18 wherein said RF pulse signal is within a predetermined range of pulse durations; wherein said dwell interval is less than said pulse duration; and wherein said predetermined interval provided by said delay means equals the sum of one half of the duration of the RF pulse and the transition switching time of said switching means.

20. The invention as defined in claim 19 wherein said second transmission channel is substantially identical to said first transmission channel in all respects, exclusive of said delay means.

21. The invention as defined in claim 19 wherein said first means comprises:

RF switching means having two inputs and an output;
RF tuner means for deriving an IF signal from inputted RF signals;
said output of said switching means being coupled to said RF tuner means for supplying RF signals thereto;
power divider means having an input and two outputs for dividing signals applied at an input to said two outputs;
said input of said power divider means being coupled to said RF tuner means and said two outputs of said power divider means being coupled to said first and second signal transmission channels, respectively.

22. The invention as defined in claim 18 wherein said RF pulse signal is within a predetermined range of pulse durations; wherein said dwell interval is no larger than one half of said pulse duration; and wherein said predetermined interval provided by said delay means equals the sum of one half of the duration of the RF pulse and the transition switching time of said switching means.

23. Apparatus for determining the angle of arrival of an RF signal emitted by a remote transmitter, comprising:
receiving means responsive to reception of said RF signal at two spaced locations for forming a composite signal, containing a signal sample representative of the RF signal received at one location alternating seriatum with a signal sample representative of the RF signal from the other location;
signal transmission means responsive to said composite signal for outputting said composite signal at first and second outputs; said signal transmission means including delay means for delaying said composite signal output at said first output to cause a signal sample received at said one location and contained within said composite signal in said first channel to overlap in time with a signal sample received at said other location and contained within said composite signal in said second channel; and
phase indicating means responsive said outputs from said signal transmission means for providing a representation of electrical phase difference between aid channel outputs; whereby said angle of arrival of said RF signal is obtained.

* * * * *